United States Patent [19]
Nakagawa et al.

[11] Patent Number: 5,164,957
[45] Date of Patent: Nov. 17, 1992

[54] ENERGY BEAM DIRECTOR APPARATUS

[75] Inventors: Alvin H. Nakagawa; Richard L. Frohlich, both of San Jose, Calif.

[73] Assignee: Westinghouse Electric Corp., Pittsburgh, Pa.

[21] Appl. No.: 753,141

[22] Filed: Aug. 20, 1991

[51] Int. Cl.⁵ .............................................. H01S 3/08
[52] U.S. Cl. ...................................... 372/99; 148/565
[58] Field of Search ................. 372/99; 148/565, 586, 148/DIG. 90; 219/121.79; 359/220, 234, 876

[56]        References Cited
           U.S. PATENT DOCUMENTS 4,533,400  8/1985  Benedict ............................ 148/586
4,539,461  9/1985  Benedict et al. .................... 148/565

FOREIGN PATENT DOCUMENTS 59-151421  8/1984  Japan ........................ 148/DIG. 90

Primary Examiner—John D. Lee
Assistant Examiner—Robert E. Wise

[57]        ABSTRACT

In a laser beam processing of the side surfaces of gear teeth, a rotatable disk is inserted in the recess between the teeth to reflect and redirect laser beam energy toward one surface while protecting the surface of an adjacent gear tooth. The rotatable disk is relatively thin and accordingly is cooled by means of liquid and/or gas jets. During the laser beam operation on the surfaces of the gear teeth, the laser beam, as well as the rotating disk; are translated across the face of the gear tooth.

15 Claims, 5 Drawing Sheets

ENERGY BEAM DIRECTOR APPARATUS

BACKGROUND OF THE INVENTION

1. Field of the Invention

The invention in general relates to the heat-treating of a workpiece by an energy beam, and in particular to apparatus for controlling the impingement of the beam on the workpiece.

2. Background Information

An energy beam such as a laser is often used in metal processing operations to create a thin, hard outer surface on a metallic workpiece.

Some workpieces, for example gears, have recesses into which the laser beam is directed for accomplishing a heat-treating operation. It is possible to direct narrow, low power laser beams with great accuracy; however, the generally broader, high power beam such as from a carbon dioxide laser used for such operations are more difficult to precisely control. As will be brought out, such high power laser beam operations often produce less than satisfactory results, particularly on gear teeth wherein the gear turns in both directions.

SUMMARY OF THE INVENTION

In accordance with the present invention, energy beam director apparatus is provided for controlling an energy beam during beam processing operations of a recessed portion of a workpiece. The apparatus includes a disk member for partial insertion into the recessed portion and in the path of the energy beam. Means are provided for rotating the disk member about a central axis during a beam-processing operation. The disk member has a surface which is constructed and arranged to reflect the energy beam to predetermined portions of the recess during rotation of the disk and to prevent the beam from impinging upon other portions of the recess. Means are also provided for cooling the disk member during the processing operation.

DESCRIPTION OF THE PREFERRED EMBODIMENT

Figure 1:
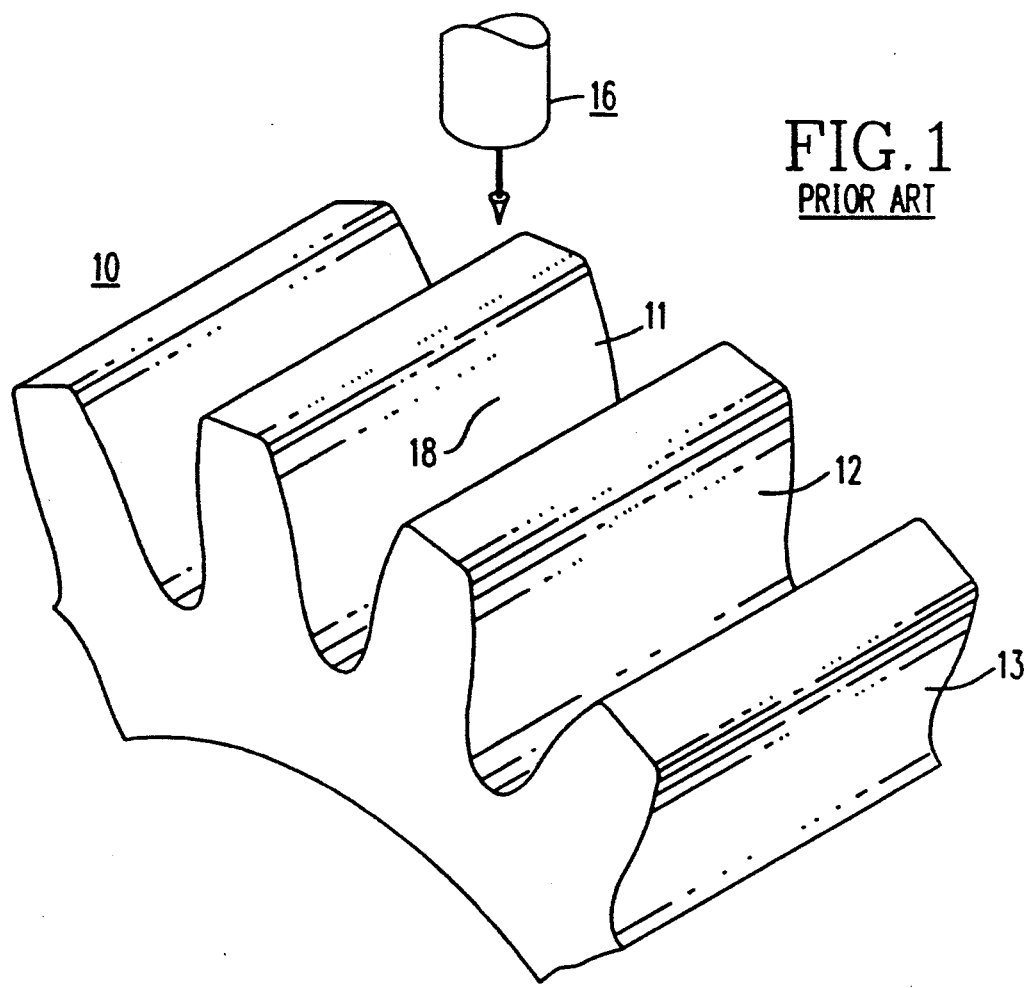
FIG. 1 illustrates a portion of a gear in conjunction with energy beam apparatus for beam processing the gear.

Although the invention is applicable for use with different energy beams and different workpieces having recesses, it will be described by way of example with respect to a laser beam for performing heat treatment operations on the teeth of a gear. FIG. 1 illustrates a portion of a gear 10 having a plurality of teeth, three of which 11, 12 and 13 are illustrated.

Laser beam apparatus 16 is operable to project a laser beam, as indicated by arrow 18, toward the exposed facing surfaces of teeth 11 and 12, to, for example, case-harden these surfaces.

Figure 2:
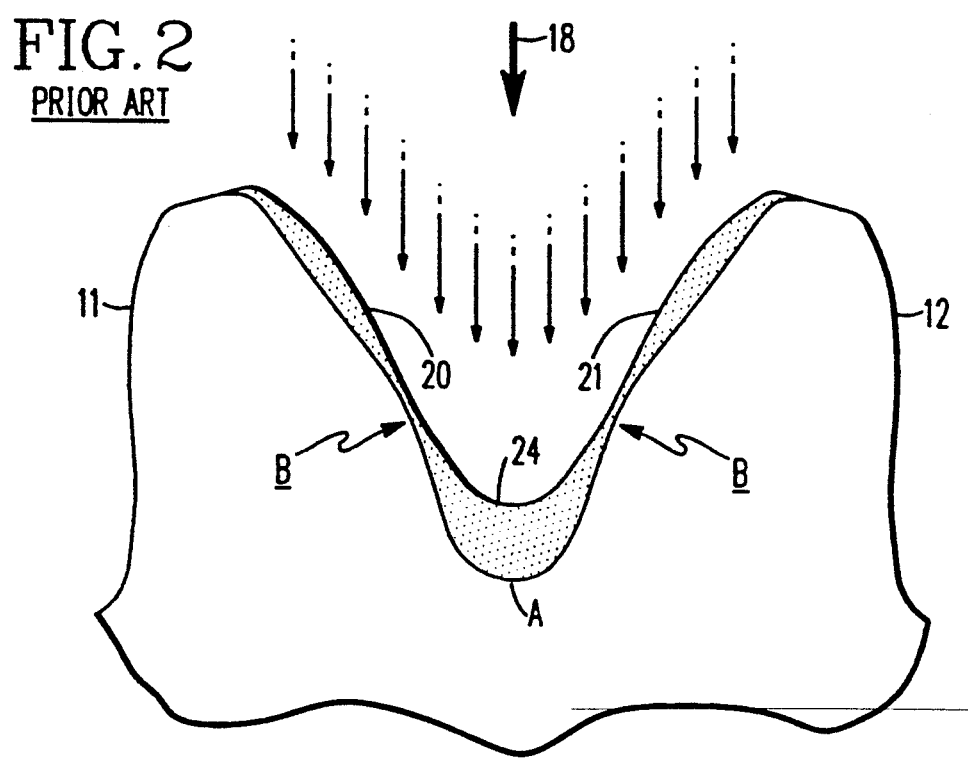
FIG. 2 illustrates two adjacent teeth of the gear and the surface hardening achieved with the energy beam directed head-on toward the root.

FIG. 2 illustrates one method of accomplishing the case-hardening of two facing teeth surfaces 20, 21. The laser beam may be of a dimension so as to simultaneously impinge upon surfaces 20, 21, as well as root 24, or the beam may be of a narrower size, in which case impingement of the total surface area under consideration would be by physical movement or oscillation of the beam.

The amount of energy absorbed by the irradiated surface, and therefore the depth of transformation hardening, is a function of the angle of incidence of the laser beam. In FIG. 2 the surface-hardening is represented by the stippled area, and it is seen that with the head-on beam impingement, the greatest penetration is at point A in the root area while the least depth penetration occurs at points B. During operation of the gear, however, where the gear rotates in both directions, the greatest stress concentration occurs at points B. It would therefore be desirable to increase the depth of case-hardening at these points.

Figure 3:
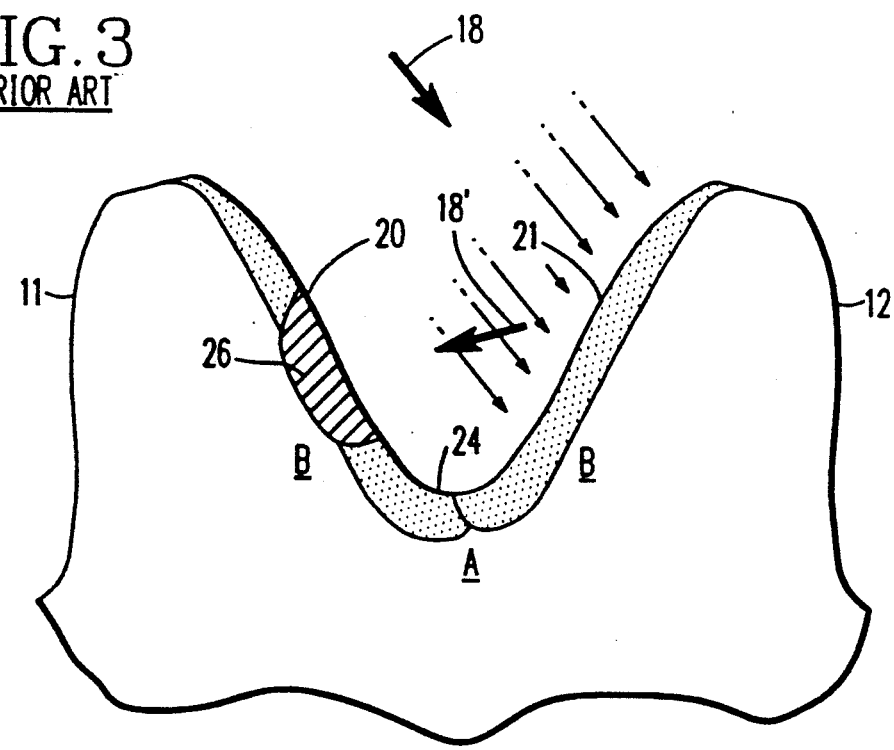
FIG. 3 illustrates an energy beam directed at an angle to a gear tooth.

One method to accomplish this greater depth penetration involves angling the laser beam and treating each opposed surface separately. This technique, however, poses additional problems as illustrated in FIG. 3, wherein surface 20 has previously been treated to a high surface hardness and surface 21 is presently being treated by means of the angularly directed laser beam represented by arrow 18. As the laser beam impinges upon surface 21, a portion of the beam, as represented by arrow 18', is reflected toward the opposite surface 20. The reflected laser beam has enough energy to cause tempering or softening of the previously hardened surface, as approximately indicated by the crosshatched section 26, of a portion of the previously treated surface. Such softening of the previously treated surface will reduce the bending and contact fatigue strength of the gear tooth 11.

Figure 4:
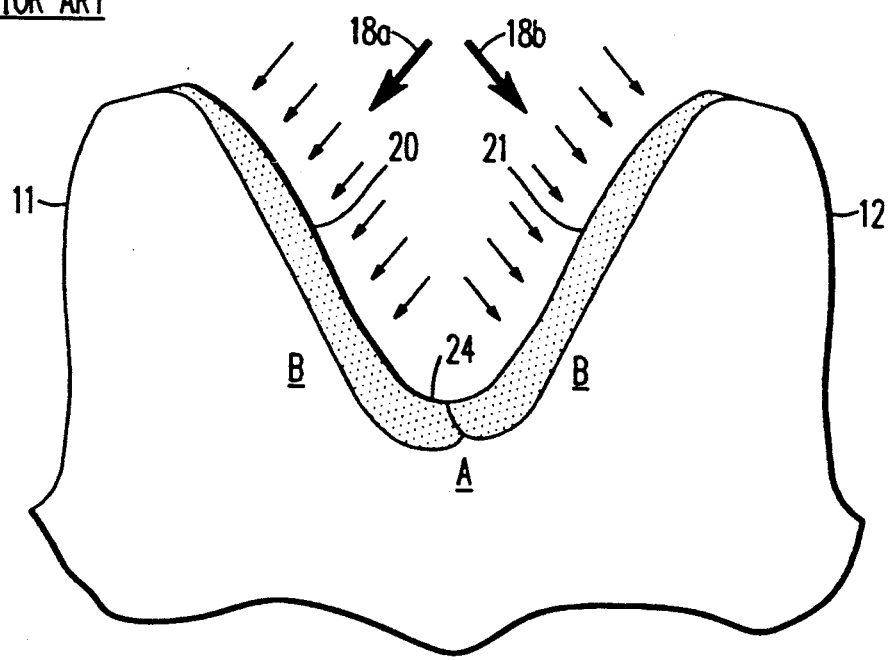
FIG. 4, is similar to FIG. 3 however, utilizing two energy beams directed at opposing surfaces of the adjacent gear teeth.

The softening problem depicted in FIG. 3 can be eliminated by using two laser beams as indicated by arrows 18a, 18b in FIG. 4. In this arrangement both surfaces 20, 21 are irradiated simultaneously, and any laser energy reflected from one surface to the other would not cause a softening in an already heat-treated area since the area is concurrently being treated with the laser beam. The arrangement of FIG. 4 poses some problems in that if two different laser systems are utilized, the expense of the heat-treating operation is increased, and with two different laser systems, it is difficult to balance the power in the two beams. If a single laser system is utilized, the beam must be, split so as to be directed toward the surfaces as indicated by the direction of arrows 18a, 18b, and for this purpose an expensive, complicated, and inefficient optic system is required.

Figure 5:
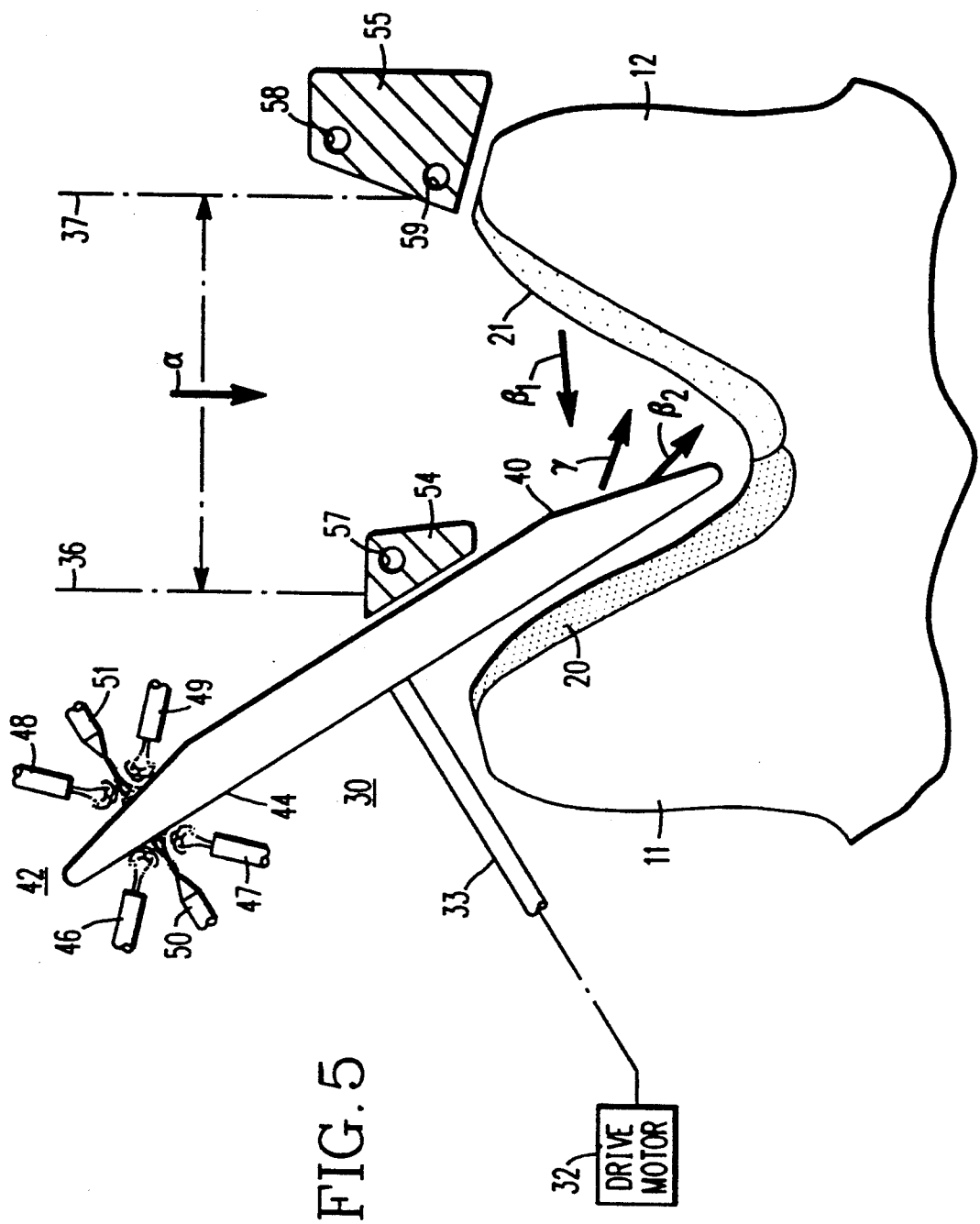
FIG. 5 illustrates one embodiment of the present invention.

With the present invention, a uniform laser beam heat treatment of both opposing surfaces of the gear teeth may be accomplished, and to this end reference is made to FIG. 5, illustrating one embodiment of the present invention. The apparatus includes a circular disk member 30 which is partially inserted into the recess portion between teeth 11, 12, and which covers the previously treated and case-hardened surface 20. The disk member 30 is rotatable about a central axis by means of a drive motor 32 coupled to central shaft.

A single laser beam is used in the heat-treating process and is represented by arrow $\alpha$. The beam may be of a width indicated by limits 36, 37, or may be of a smaller width and oscillated, by well-known techniques, between the limits 36, 37.

Arrow $\beta_1$ is representative of laser beam energy reflected off of surface 21; arrow $\beta_2$ is representative of laser beam energy reflected off of the front surface 40 of the disk member 30; and arrow $\gamma$ is representative of the energy reflected off of surface 40 from the reflected energy of $\beta_1$. Thus it is seen that the disk member 30 not only protects the previously treated surface 20 but additionally directs incident and reflected energy toward surface 21 in the heat-treating process thereof to obtain a more uniform depth of hardening. The heat treat overlap region at the bottom root radius between adjacent gear teeth has been shown by others using photo elastic studies and fatigue studies to be a low stress, low risk area.

Disk member 30 is relatively thin so as to be able to reach into the recess and would be subject to overheating or melting by the high energy laser beam impingement. Accordingly, the disk member 30 must be cooled and the constant rotation of the disk member makes it possible to cool it in an area away from the region of laser beam impingement. For this purpose, a cooling means 42 is provided and FIG. 5 illustrates the cooling of the disk member 30 by cooling fluid on both the front surface 40 and the rear surface 44 at a location away from laser impingement.

As illustrated, by way of example, cooling means 42 may include gas jets 46-49 for supplying a cooling gas such as argon. A more effective way of removing heat from the surfaces of the disk member 30 is by evaporation of a spray which is directed onto the surfaces. Accordingly, the cooling means 42 may additionally include liquid jets 50, 51 for spraying a liquid such as distilled water onto the surfaces of the disk member.

With the oscillation of the laser beam, a reversal of direction occurs at the limits 36, 37, at which points there may be a certain dwell time. In order to protect the disk member 30, as well as the tip of tooth 21, laser beam mask means in the form of, for example, copper masks 54, 55 are provided. These masks may have suitable cooling passages such as 57 in mask 54, and passages 58, 59 in mask 55.

The copper masks may have highly polished reflective surfaces to redirect the energy to locations where the original beam is deficient, or to where the original beam cannot reach directly. Additionally, or alternatively, the masks may be shaped so as to redirect the impinging beam to a remote location where it may be absorbed.

Figure 6:
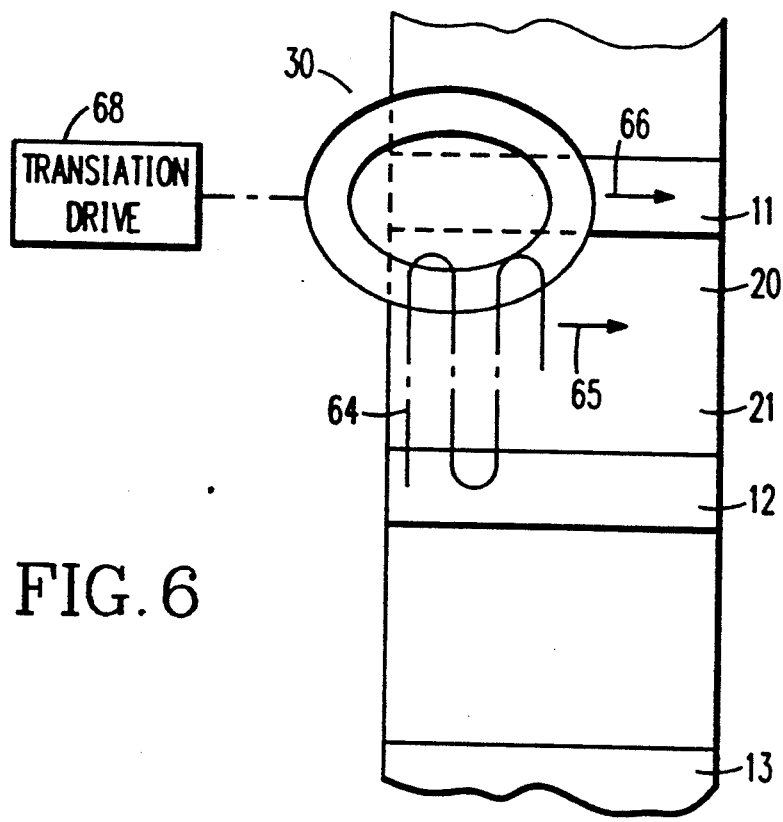
FIG. 6 illustrates the translation of the disk member of FIG. 5 during a processing operation.

During the laser beam operation on surface 21, the laser beam is oscillated between limits 36, 37, and disk member 30 rotates about its central axis. In addition, since the tooth has a finite width from front to back, the laser beam and disk member 30 are additionally translated across the tooth width. This operation is further illustrated in the plan view of FIG. 6 wherein the path of the laser beam is indicated by the dot-dash line 64. In FIG. 6 it is seen that the laser beam oscillates as well as translates in the direction of arrow 65. Concurrently therewith, the disk member 30 also translates in the direction of arrow 66 by means of translation drive 68.

Figure 7:
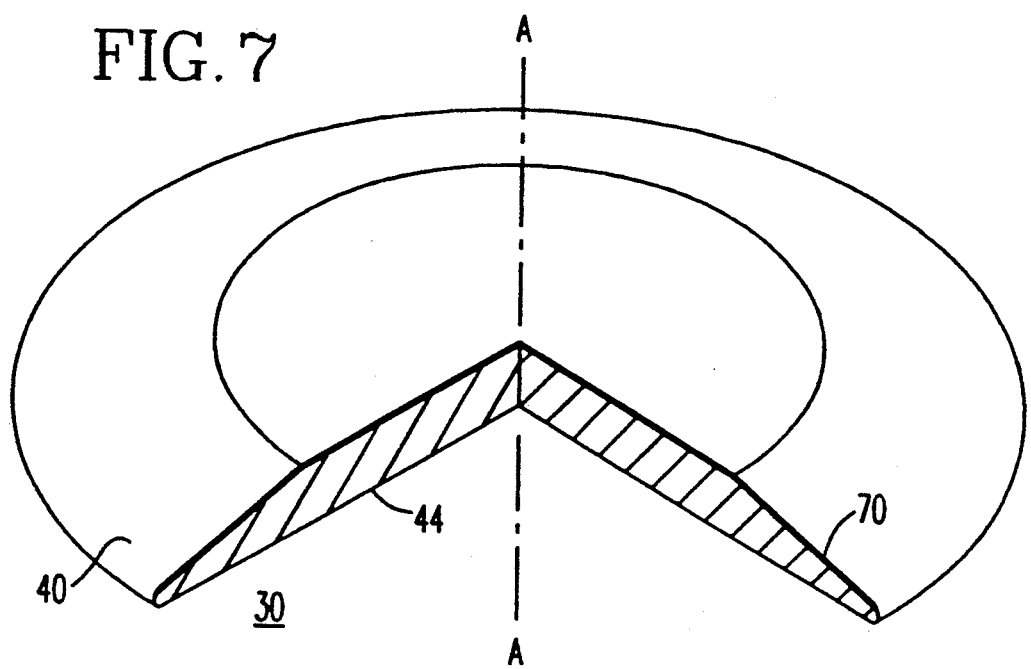
FIGS. 7 through 9 illustrate different embodiments of the disk member.

FIG. 7 illustrates the disk member 30 having a central axis A—A. The Figure illustrates a quadrant broken away. The disk member, by way of example, may be made from copper, copper alloys, zero expansion alloys, zero expansion graphite reinforced metal matrix composites, refractory metals such as molybdenum, or other materials used by themselves or in any combination of clads, overlays, platings or cores including sodium filled cores. In the embodiment illustrated in FIG. 7, an axial cross section through the disk member reveals that the front surface is sloped toward the back surface and wherein the slope defines a straight line 70.

Figure 8:
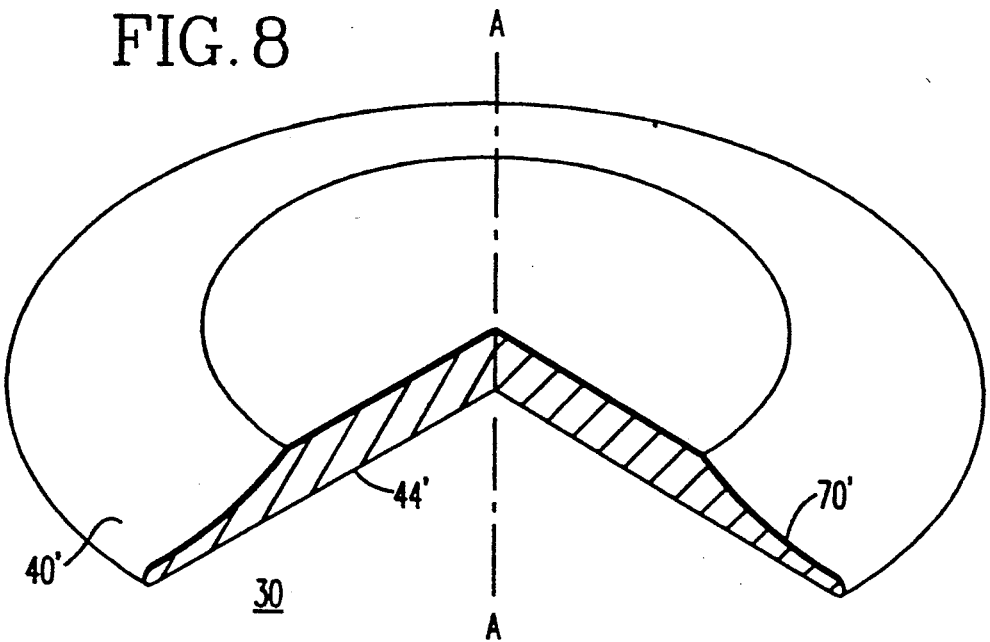

FIG. 8 illustrates another embodiment of a disk member 30' having front and back surfaces 40', 44'. In this embodiment, an axial cross section through the disk member defines a slope which is a curved line 70'.

Figure 9:
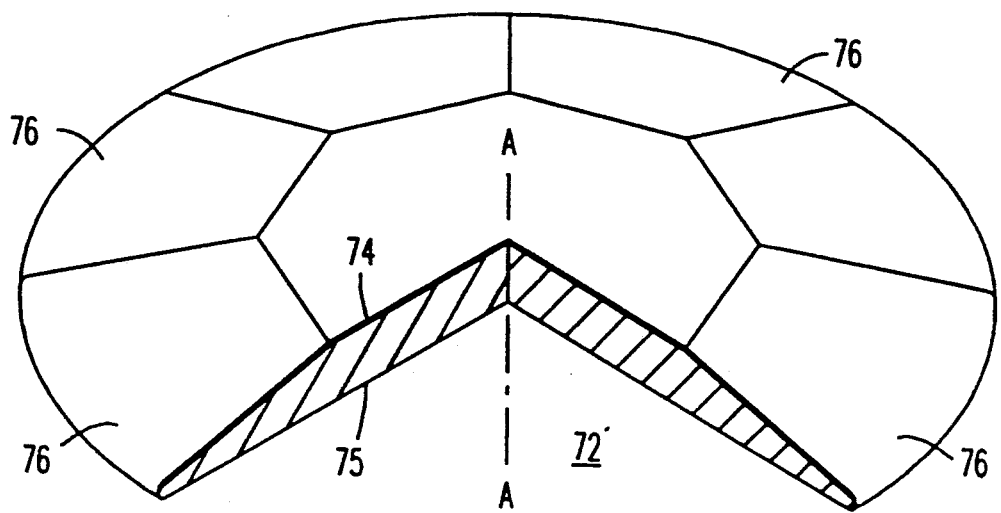

For some laser operations, the laser beam can be pulsed to cause rapid heating and subsequent cooling to make the surface harder. This pulsing operation may also be accomplished with the disk member 72 illustrated in FIG. 9. In the arrangement of FIG. 9, disk member 72 includes a front surface 74 and a back surface 75 wherein the front surface 74 includes a plurality of adjacent reflective facets 76.

We claim:

1. Energy beam director apparatus for controlling an energy beam during beam processing operations of a recessed portion of a workpiece, comprising:
   a) a disk member for partial insertion into said recessed portion and in the path of said energy beam;
   b) means for rotating said disk member about a central axis during a said beam processing operation;
   c) said disk member having a surface constructed and arranged to reflect said energy beam to predetermined portions of said recess during rotation thereof.

2. Apparatus according to claim 1 which includes:
   a) means for cooling said disk member.

3. Apparatus according to claim 2 wherein:
   a) said energy beam is a laser beam.

4. Apparatus according to claim 2 wherein:
   a) said workpiece is a gear having a plurality of teeth and said recess is the space between two of said teeth.

5. Apparatus according to claim 2 wherein:
   a) said disk member includes a front surface and a back surface;
   b) said means for cooling includes fluid jet means for directing a cooling fluid onto at least one of said surfaces of said disk member.

6. Apparatus according to claim 5 wherein:
   a) said means for cooling is constructed and arranged to direct said cooling fluid onto both said surfaces of said disk member.

7. Apparatus according to claims 5 or 6 wherein:
   a) said cooling fluid is a gas.

8. Apparatus according to claims 5 or 6 wherein:
   a) said cooling fluid is a liquid.

9. Apparatus according to claims 5 or 6 wherein:
   a) said means for cooling includes means for directing both a cooling gas and a cooling liquid onto said surface or said surfaces of said disk member.

10. Apparatus according to claim 1 which includes:
    a) energy beam mask means positioned to prevent impingement of said energy beam onto predetermined portions of said workpiece and disk member.

11. Apparatus according to claim 1 wherein:

a) said disk member includes a front surface and a back surface;
b) said front surface being sloped from said front to said back surface.

12. Apparatus according to claim 11 wherein:
a) in an axial cross section through said disk member, said slope defines a straight line.

13. Apparatus according to claim 11 wherein:
a) in an axial cross section through said disk member, said slope defines a curved line.

14. Apparatus according to claim 11 wherein:
a) said front surface is faceted.

15. Apparatus according to claim 1 which includes:
a) means for translating said disk member as it rotates.

* * * * *